March 29, 1949.　　　　R. L. YORK　　　2,465,413
CUTTING TORCH GUIDE DEVICE
Filed Nov. 1, 1944　　　　　　　　　　2 Sheets-Sheet 1
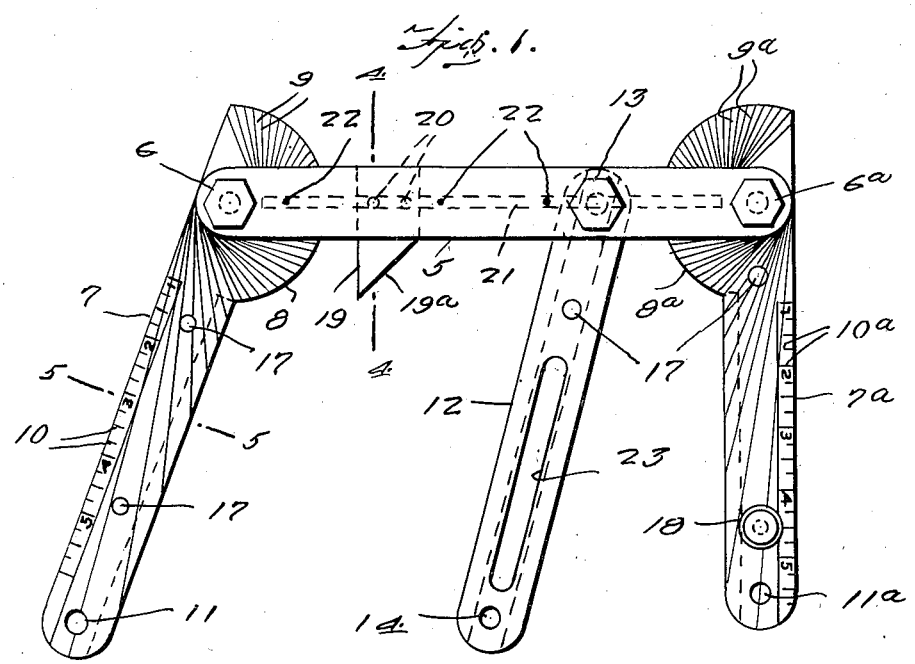
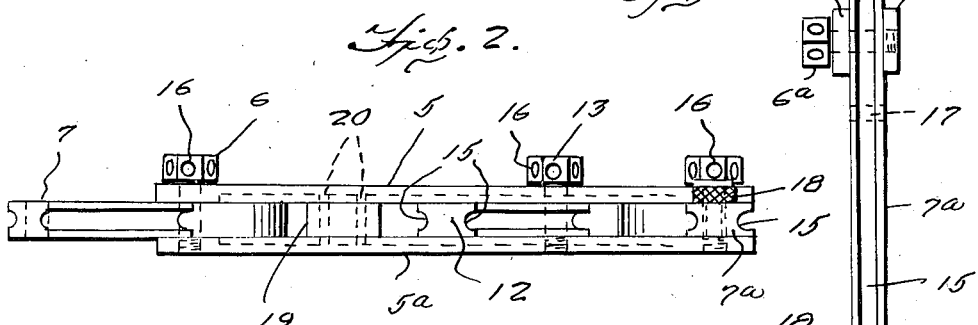
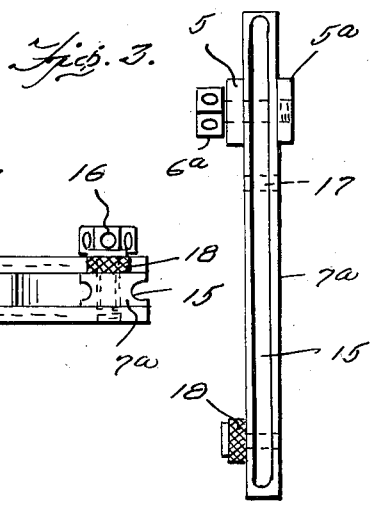
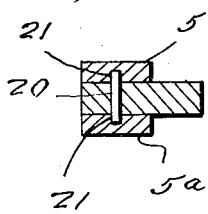 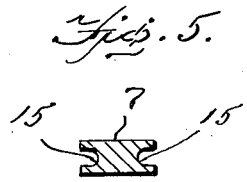
Inventor
Ralph L. York
By Clarence A. O'Brien
and Harvey B. Jacobson
Attorneys March 29, 1949.  R. L. YORK  2,465,413
CUTTING TORCH GUIDE DEVICE Filed Nov. 1, 1944  2 Sheets-Sheet 2

Inventor
Ralph L. York
By Clarence A. O'Brien
and Harvey B. Jackson
Attorneys

Patented Mar. 29, 1949

2,465,413

UNITED STATES PATENT OFFICE 2,465,413

CUTTING TORCH GUIDE DEVICE

Ralph L. York, Lebanon, Oreg.

Application November 1, 1944, Serial No. 561,417

2 Claims. (Cl. 33—98)

This invention relates to a guiding device for cutting torches, and the primary object of the invention is to provide a device of this kind by means of which the tip of a cutting torch may be effectively guided in straight lines and at a variety of predetermined angles to facilitate production of various structural parts from metal stock.

A further object of the present invention is to provide a guiding device of the above kind including stock rest bars and a plurality of straight edge torch guides detachably pivoted to the stock rest bars for angular adjustment relative to the latter, the longitudinal guiding edges of the torch guides being grooved in a manner to minimize disturbance of the torch flame and to reduce the area exposed to flying sparks.

A further object of the present invention is to provide a guiding device of the above kind which is comparatively simple and durable in construction, economical to manufacture, easy to use, and so constituted as to eliminate the necessity of laying out the work prior to the cutting operation.

More specific objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a plan view of a torch guiding device constructed in accordance with the present invention.

Figure 2 is an elevational view of the device as seen looking upwardly at Figure 1.

Figure 3 is an elevational view looking toward the left of Figure 1.

Figure 4 is a section taken on the plane of line 4—4 of Figure 1.

Figure 5 is a section on line 5—5 of Figure 1.

Figure 6:
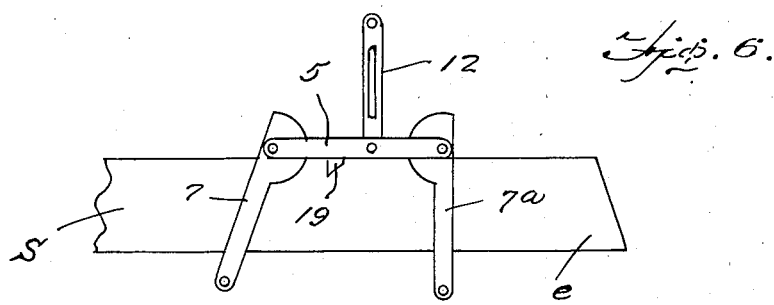

Figures 6 to 10, inclusive, are diagrammatic plans illustrating some of the many ways in which the present device may be employed.

Referring in detail to the drawings, the present device or tool includes a pair of substantially similar stock rest bars 5 and 5a having straight longitudinal edges and adjustably connected at their opposite ends by clamping screws 6 and 6a which pass freely through openings in the bar 5 and are threaded into openings in the bar 5a. Pivoted at corresponding ends between the bars 5 and 5a and respectively on the removable clamping screws 6 and 6a are torch guides 7 and 7a consisting of protractor-type straight edges having segments 8 and 8a at their pivoted ends. The clamping screws 6 and 6a are located at the axes of the segments 8 and 8a, and the latter have degree lines or graduations 9 and 9a that extend tangentially of the segments so that when any graduation is registered with the inner longitudinal edges of the bars 5 and 5a, such graduation will be parallel with said edges to facilitate accurate reading. The arrangement is such that by loosening the clamping screws 6 and 6a the guides 7 and 7a may be set at any desired angle relative to the bars 5 and 5a and may be frictionally secured in the set position by tightening the screws 6 and 6a so as to draw the ends of the bars 5 and 5a snugly against the opposite faces of the segments 8 and 8a. The guides 7 and 7a are also preferably graduated in inches and fractions thereof, as indicated at 10 and 10a along their edges remote from the segments 8 and 8a. It will be noted that the guides 7 and 7a are formed with openings 11 and 11a at the ends remote from the segments 8 and 8a, which openings are of a size to receive the clamping screws 6 and 6a. Thus, upon removal of the screws 6 and 6a, the guides may be reversed end for end so that they may be pivoted at either end between the bars 5 and 5a by the clamping screws 6 and 6a.

Figures 8, 10:
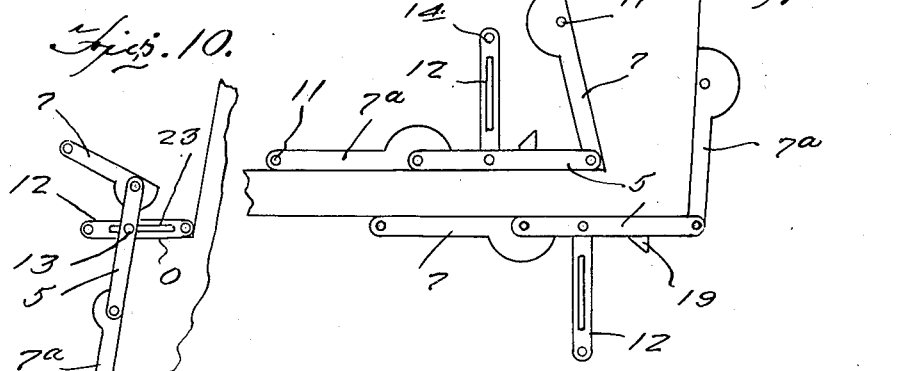
Figure 9:
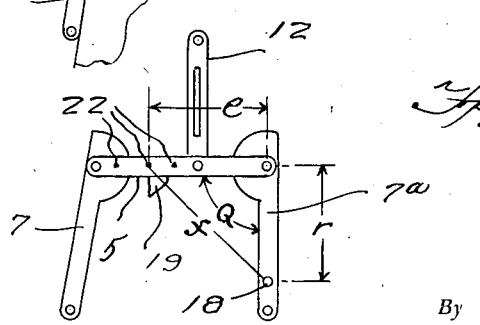

A further or third torch guide 12 in the form of a plain straight edge is pivoted on a clamping screw 13 between the bars 5 and 5a intermediate the guides 7 and 7a and nearer the latter than the former. This guide 12 has an openings 14 at each end to accommodate the clamping screw 13 so that either end of the guide 12 may be pivoted between the bars 5 and 5a. As shown more clearly in Figures 2 and 5, the guides 7, 7a and 12 are relatively thick and are provided centrally of their longitudinal or straight edges with relatively wide and deep grooves 15. In practice, the tip of the cutting torch is disposed against the desired longitudinal edge of the desired torch guide above the adjacent groove 15 and in spaced relation to the surface of the work. Thus, air may flow to the flame due to the clearance provided by the adjacent groove 15, thereby minimizing flame disturbance and reducing the area of the edge of the guide directly exposed to flying sparks. This promotes smooth and speedy cutting. It will of course be understood that the clamping bolt 13 is also removable and is freely passed through the bar 5 and threaded into the bar 5a. The heads of the screws 6, 6a and 13 are preferably provided with transverse openings 16 so that a welding rod may be utilized to loosen or tighten the screws by merely inserting an end of the welding rod in an opening 16 of the screw heads. It is further pointed out that the guide 12 may be disposed to extend from the bars 5 and 5a in a direction opposite from that in which the guides 7 and 7a extend, thereby permitting use of the guide 12 as a handle, as generally illustrated in Figures 6, 8 and 9.

Each torch guide is provided intermediate its ends with a plurality of spaced threaded openings 17 adapted for selective removable reception of a headed stud 18 whose head is of a thickness similar to that of the bar 5. The stud 18 is thus capable of use to support a torch guide in spaced relation to the surface of the stock when the device is used upon the upper surface of a large stock plate to cut out various shapes or sections.

A short rest lug or plate 19 is mounted at one end between the bars 5 and 5a and between the guides 7 and 12 for adjustment longitudinally of said bars 5 and 5a. For this purpose, a plurality of pins 20 are secured in the lug or plate 19 and have projecting ends slidably engaged in longitudinal central grooves 21 provided in the inner surfaces of the stock rest bars 5 and 5a. The pins 20 are of a length whereby they will be tightly clamped between the bars 5 and 5a when the screws 6, 6a and 13 are tightened to secure the guides 7, 7a and 12 in adjusted position, thereby securing the lug or plate 19 in adjusted position. Conversely, upon loosening the screws 6, 13 and 6a, the pins 20 are released sufficiently to permit adjustment of the lug or plate 19 longitudinally of the bars 5 and 5a. As shown in Figure 1, the bars 5 and 5a are provided with a longitudinal series of spaced punch marks 22, and it is noted that the openings in the guides and the bars 5 and 5a and the punch marks 22 are arranged in the longitudinal centers of those members. As the guides may be attached to the bars 5 and 5a to project laterally from either side of the latter, the device is reversible. This reversal of position can also be had with respect to the lug or plate 19, and either end of each guide may be pivoted between the bars 5 and 5a to adapt the device or tool for various uses, as illustrated in Figures 6 to 9, inclusive.

Figure 7:
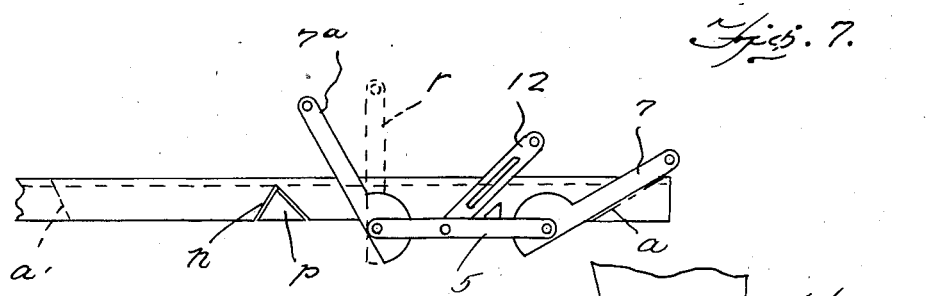

The present torch guide device is primarily used as a guide for the torch tip in cutting required pieces by measuring from a given point, thereby saving lay-out time. In practice, the side of the cutting torch tip is rested lightly against a side or straight edge of the desired guide 7, 7a or 12, and the torch is moved along at the proper height and speed to make the required cut in the stock. As shown in Figure 6, the device or tool may be set on a piece of bar stock, the guide 12 projecting from bars 5 and 5a in a direction opposite that at which the guides 7 and 7a extend so that said guide 12 may be employed as a handle and counterbalance. In this use the bar 5a is rested against a longitudinal edge of the bar stock S and the plate or lug 19 rests on the upper surface of the stock along with the guides 7 and 7a. The guides 7 and 7a are set at the desired angle to the bars 5 and 5a and then successively used to guide the tip of the torch across the stock. For instance, if the guide 7a is used, the end e of the stock will constitute the piece required. As shown in Figure 7, the tool or device may be used on angle iron to make parts required. Guide 12 is set to cut out a piece $p$ so as to produce a notch $n$, while guide 7 is set to cut along the angle $a$. Guide 7a is set to cut along the angle $a'$, thereby producing a piece of stock between the angles $a$ and $a'$, that may be bent at the notch $n$ to provide an angular structural part. In this use, the cuts are provided in one flange of the angle iron, whereupon the guide 7a may be reset to the dotted line position $r$ to facilitate cutting straight across the other flange of the angle iron and thereby complete the production of the piece desired. In Figure 8, there are illustrated two uses of the tool or device wherein the tool is set for the angle of cut by placing the tool in the position where the part to be cut is to fit.

Figure 9 illustrates the use of stud 18 and a desired one of the center punch marks 22. The holes 17 and punch marks 22 are so laid out that the angle between the stock rest bars and the torch guides can be measured by screwing the stud 18 into the proper hole 17. With this arrangement, distance $x$ between a punch mark 22 and stud 18 equals $$2r \text{ sine of } \left(\frac{Q}{2}\right)$$

The projecting end of lug 19 is preferably beveled at a predetermined angle, as at 19a so that this lug or plate may be employed to facilitate adjustment of the plane guide 12. Guide 12 is also provided with a central longitudinal elongated slot 23 located nearer one end of said guide than the other end thereof.

From the foregoing description, it will be seen that it is possible to make cuts accurately and rapidly by using the present device or tool. The angle of the torch guides in relation to the stock rest bars can be set quickly by use of the degree scale on the torch guide, by direct measurement, or by setting the tool on the angle piece it is to fit, as well as by using $$2r \text{ sine of } \left(\frac{Q}{2}\right)$$

as a diagonal measurement. After setting, the angle of the torch guide is held firmly by tightening the proper clamping screw. As the tool is reversible, all of the opposite angles of any setting may be cut. The tool or device can be placed in position for a cut or may be removed or moved along for other cuts with ease. At the same time, the friction of the tool against the stock is sufficient to prevent the tool or device from being easily bumped out of position by the torch tip. Also, the tool can be quickly adapted to the job at hand because the torch guides can be easily removed, interchanged, or turned end for end to provide many combinations.

The slot 23 may receive screw 13 so that guide 12 may be used as shown in Figure 10. In this way, guide 12 may be adjusted to partially project from bars 5 and 5a the required distance when used relative to an angle or offset $o$ in the work which is of a length less than that of said bar 12.

From the foregoing description, it is believed that the construction and manner of use, as well as the advantages, of the present invention will be readily understood and appreciated by those skilled in the art. Minor changes in details of construction illustrated and described are contemplated, such as fairly fall within the spirit and scope of the invention as claimed.

What I claim is:

1. In a cutting torch guide device, the combination of a pair of substantially similar elongated stock rest bars having parallel straight longitudinal edges, clamping screws adjustably connecting opposite ends of said stock rest bars, elongated torch guides pivoted at corresponding ends on said screws and releasably clamped by the latter between the ends of said stock rest bars, each torch guide consisting of a straight edge bar provided at its pivoted end with a laterally projecting segment having degree lines extending tangentially thereof to selectively register with corresponding longitudinal edges of the stock rest bars in different angular positions of the torch guides relative to the stock rest bars, said torch guides being relatively thick and having longitudinal grooves in their longitudinal edges to minimize disturbance of the flame of a torch guided thereby.

2. In a cutting torch guide device, the combination of a pair of substantially similar elongated stock rest bars having parallel straight longitudinal edges, clamping screws adjustably connecting opposite ends of said stock rest bars, elongated torch guides pivoted at corresponding ends on said screws and releasably clamped by the latter between the ends of said stock rest bars, each torch guide consisting of a straight edge bar provided at its pivoted end with a laterally projecting segment having degree lines extending tangentially thereof to selectively register with corresponding longitudinal edges of the stock rest bars in different angular positions of the torch guides relative to the stock rest bars, said stock rest bars being provided with opposed central longitudinal grooves in their adjacent surfaces, and a rest plate having an end disposed between the stock rest bars and provided with a plurality of transverse pins having their ends projecting into said grooves to mount the rest plate in place for sliding adjustment longitudinally of said stock rest bars.

RALPH L. YORK.

REFERENCES CITED

The following references are of record in the file of this patent:

UNITED STATES PATENTS

| Number | Name | Date |
|---|---|---|
| 828,803 | Berard, Jr. | Aug. 14, 1906 |
| 1,091,332 | Hart | Mar. 24, 1914 |
| 1,351,476 | Hill | Aug. 31, 1920 |
| 1,668,085 | Orzel | May 1, 1928 |
| 1,825,759 | Smith | Oct. 6, 1931 |
| 2,406,531 | Dahle | Aug. 27, 1946 |

FOREIGN PATENTS

| Number | Country | Date |
|---|---|---|
| 382,202 | Germany | Sept. 29, 1923 |